United States Patent
Thuillard et al.

(10) Patent No.: US 12,146,580 B2
(45) Date of Patent: Nov. 19, 2024

(54) ACTUATOR AND METHOD OF OPERATING THE ACTUATOR

(71) Applicant: BELIMO HOLDING AG, Hinwil (CH)

(72) Inventors: Marc Thuillard, Uetikon am See (CH); Stefan Mischler, Wald (CH); Frank Lehnert, Rüti (CH)

(73) Assignee: BELIMO HOLDING AG, Hinwil (CH)

( * ) Notice: Subject to any disclaimer, the term of this patent is extended or adjusted under 35 U.S.C. 154(b) by 620 days.

(21) Appl. No.: 16/852,705

(22) Filed: Apr. 20, 2020

(65) Prior Publication Data

US 2020/0248828 A1 Aug. 6, 2020

Related U.S. Application Data

(63) Continuation of application No. 15/749,550, filed as application No. PCT/EP2016/071231 on Sep. 8, 2016, now Pat. No. 11,391,386.

(30) Foreign Application Priority Data

Oct. 6, 2015 (CH) ........................................ 1448/15

(51) Int. Cl.
*F16K 31/04* (2006.01)
*G05B 19/4062* (2006.01)

(52) U.S. Cl.
CPC .......... *F16K 31/046* (2013.01); *F16K 31/047* (2013.01); *G05B 19/4062* (2013.01);

(Continued)

(58) Field of Classification Search
USPC ........................................................ 318/561
See application file for complete search history.

(56) References Cited

U.S. PATENT DOCUMENTS

| | | | |
|---|---|---|---|
| 3,616,993 A | | 11/1971 | McGuire et al. |
| 5,059,879 A | * | 10/1991 | Watanabe ............... G05B 19/23 318/603 |

(Continued)

FOREIGN PATENT DOCUMENTS

| | | |
|---|---|---|
| CN | 104137012 A | 11/2014 |
| DE | 196 28 238 A1 | 1/1998 |

(Continued)

OTHER PUBLICATIONS

Communication dated Feb. 12, 2020 from European Patent Office in EP Application No. 19206628.0.

(Continued)

*Primary Examiner* — Jorge L Carrasquillo
(74) *Attorney, Agent, or Firm* — Sughrue Mion, PLLC

(57) ABSTRACT

An actuator (1) comprises an electric motor (11) for moving an actuated part (2) to an actuated position. The actuator (1) further comprises a controller (10) connected to the electric motor (11) and configured to determine a motor current of the electric motor (11) and to detect motor rotations. The controller (10) is further configured to determine the actuated position by counting the motor rotations detected while the motor current is at or above a current threshold indicative of a load torque, and by not counting motor rotations detected while the motor current is below said current threshold.

16 Claims, 6 Drawing Sheets

(52) U.S. Cl.
CPC .............. *G05B 2219/37632* (2013.01); *G05B 2219/41049* (2013.01); *G05B 2219/41213* (2013.01); *G05B 2219/45006* (2013.01)

(56) References Cited

U.S. PATENT DOCUMENTS

| | | | |
|---|---|---|---|
| 5,343,134 | A | 8/1994 | Wendt et al. |
| 5,646,600 | A | 7/1997 | Abdel-Malek et al. |
| 5,734,245 | A | 3/1998 | Terashima et al. |
| 6,870,339 | B2 | 3/2005 | Kessler et al. |
| 9,176,495 | B2 | 11/2015 | Monari et al. |
| 10,214,235 | B2 | 2/2019 | Sasaki et al. |
| 2003/0146724 | A1 | 8/2003 | Kessler et al. |
| 2005/0213111 | A1 | 9/2005 | Suzuki et al. |
| 2006/0093695 | A1* | 5/2006 | Ueda ................ B29C 45/84 |
| | | | 425/150 |
| 2006/0184154 | A1 | 8/2006 | Moberg et al. |
| 2006/0259195 | A1* | 11/2006 | Eliuk ................ G07F 11/70 |
| | | | 700/245 |
| 2007/0194218 | A1 | 8/2007 | Mullet et al. |
| 2008/0001568 | A1 | 1/2008 | Hori et al. |
| 2011/0127938 | A1 | 6/2011 | Kawakami et al. |
| 2012/0050675 | A1* | 3/2012 | Masaki ............. G05G 9/04792 |
| | | | 351/206 |
| 2013/0041284 | A1 | 2/2013 | Thompson et al. |
| 2014/0031569 | A1 | 1/2014 | Soerensen et al. |
| 2014/0316569 | A1 | 10/2014 | Monari et al. |
| 2015/0149100 | A1 | 5/2015 | Eisenbeis et al. |
| 2015/0176931 | A1 | 6/2015 | Aeberhard et al. |
| 2015/0321283 | A1 | 11/2015 | Hatada et al. |
| 2017/0015348 | A1* | 1/2017 | Sasaki ................. B62D 5/049 |
| 2018/0298671 | A1 | 10/2018 | Roppongi et al. |

FOREIGN PATENT DOCUMENTS

| | | |
|---|---|---|
| DE | 100 34 014 A1 | 2/2002 |
| WO | 2015/141254 A1 | 9/2015 |

OTHER PUBLICATIONS

Written Opinion of PCT/EP2016/071231 dated Dec. 21, 2016 [PCT/ISA/237].
International Search Report of PCT/EP2016/071231 dated Dec. 21, 2016 [PCT/ISA/210].
Chinese Office Action issued Aug. 22, 2023 in Application No. 202110127227.2.

* cited by examiner

ACTUATOR AND METHOD OF OPERATING THE ACTUATOR

CROSS REFERENCE TO RELATED APPLICATIONS

This application is a continuation application of U.S. application Ser. No. 15/749,550, filed Feb. 1, 2018, which is a National Stage of International Application No. PCT/EP2016/071231, filed Sep. 8, 2016, claiming priority based on Swiss Patent Application No. 01448/15, filed Oct. 6, 2015, the contents of each of which are incorporated by reference herein in their entirety.

FIELD OF THE INVENTION

The present invention relates to an actuator and a method of operating the actuator. Specifically, the present invention relates to an actuator comprising an electric motor for moving an actuated part to an actuated position, and a controller connected to the electric motor and configured to detect motor rotations.

BACKGROUND OF THE INVENTION

Actuators with electric motors and controllers for controlling the motors are used in a multitude of applications where actuated parts are moved. The actuated parts are coupled to the actuator or its electric motor, respectively, by a coupling arrangement including drive shafts, gears, chains, and/or levers or rods, for example. Depending on the application, e.g. in HVAC (Heating, Ventilating, Air Conditioning and Cooling) applications, the actuated parts include valves, dampers, flaps, and the like, e.g. for adjusting an orifice to regulate the flow of fluids, such as water or air, through pipes and ducts. Typically, for a controller to control the movement of an actuated part, the controller requires information about the current position of the actuated part. As the position of the actuated part defines the fluid flow and, thus, the flow of thermal energy in HVAC applications, the accuracy of this position has a significant influence on the efficacy of achieving defined HVAC set points and reaching overall energy efficiency in the HVAC application.

SUMMARY OF THE INVENTION

It is an object of this invention to provide an actuator and a method of operating the actuator, which actuator and method do not have at least some of the disadvantages of the prior art. In particular, it is an object of the present invention to provide an actuator and a method of operating the actuator, which actuator and method enable accurate positioning of an actuated part.

According to the present invention, these objects are achieved through the features of the independent claims. In addition, further advantageous embodiments follow from the dependent claims and the description.

An actuator comprises an electric motor for moving an actuated part to an actuated position, and a controller connected to the electric motor and configured to detect motor rotations.

According to the present invention, the above-mentioned objects are particularly achieved in that the controller of the actuator is further configured to determine the actuated position by counting the motor rotations detected while the motor is operating at or above a threshold indicative of a load torque, and by not counting motor rotations detected while the motor is operating below said threshold.

In an embodiment, the controller is configured to determine a motor current of the electric motor, and to determine the actuated position by counting the motor rotations detected while the motor current is at or above a current threshold indicative of the load torque, and by not counting motor rotations detected while the motor current is below said current threshold. In other words, the controller is configured to calculate the actuated position based on the number of (full or partial) motor rotations, including the motor rotations that are performed when the level of motor current indicates that electric motor is operated with a load torque, and not including the motor rotations that are performed when the level of the motor current indicates that the electric motor is not operated with the load torque. Thereby, the precision of the actuated position is increased because idle operation of the electric motor, during changes of direction of the rotation when the actuated part is not moved, is excluded in the calculation of the actuated position.

In an embodiment, the controller is further configured to record a course of the motor current while the electric motor moves the actuated part from a first actuated position in a forward direction to a second actuated position, and from the second actuated position in a reverse direction to the first actuated position, and to define the current threshold from the recorded course of the motor current. The recorded course of the motor current indicates the changes of the level of the motor current during directional changes of the electric motor and makes it possible to detect a system hysteresis, and thus, to define the current threshold, which is used to determine whether or not the electric motor is effectively moving the actuated part and, thus, increasing or decreasing the actuated position, depending on the rotary direction of the electric motor. In an embodiment, the controller is configured to record the course of the motor current while controlling the electric motor, e.g. during an initial and/or repeated calibration phase, to move the actuated part from the first actuated position in the forward direction to the second actuated position, and from the second actuated position in the reverse direction to the first actuated position.

In an embodiment, the controller is configured to repeatedly, e.g. periodically or sporadically from time to time, record the course of the motor current and to repeatedly define the current threshold from the recorded course of the motor current. Thereby, the detection of the system hysteresis and, thus, the current threshold is adapted to changes of the actuation system caused by wear and tear, humidity, temperature, dirt, etc.

In an embodiment, the controller is further configured to detect a malfunctioning actuation of the actuated part by checking whether the present motor current deviates by more than a set tolerance level from a reference value of the motor current expected at the present actuated position.

In an embodiment, the controller is further configured to detect a malfunctioning actuation of the actuated part by checking whether the motor current exceeds a current threshold indicative of excessive torque while the actuated part is being moved to the actuated position.

In an embodiment, the controller is further configured to detect a malfunctioning actuation of the actuated part by checking whether the motor current reaches or exceeds a current threshold indicative of an end position when the actuated position is not the said end position.

In another embodiment, the controller is configured to determine a fluid flow through a valve controlled by the actuator, using a flow sensor, and to determine the actuated position by counting (including) motor rotations detected while the fluid flow changes with a movement of the electric motor, and by not counting (not including) motor rotations detected while the fluid flow remains constant with a movement of the electric motor.

In an embodiment, the controller is further configured to detect a malfunctioning actuation of the actuated part by checking whether an actuation time for moving the actuated part from a first actuated position to a second actuated position exceeds a time threshold indicative of normal actuation time.

In an embodiment, the controller is further configured to detect an idle operation of the electric motor by checking whether the motor rotations exceed a rotation threshold indicative of an end position of the motor.

In an embodiment, the controller is configured to determine the motor current by measuring a voltage over a shunt.

In an embodiment, the controller is configured to detect the motor rotations by using one or more position sensors.

In an embodiment, the controller is configured to generate PWM signals for controlling the electric motor, and to detect the motor rotations from the PWM signals.

In an embodiment, the controller is further configured to control the motor to operate at a higher speed while the motor is operating below said threshold, and to control the motor to operate at a lower speed while the motor is operating at or above said threshold.

According to the present invention, the above-mentioned objects are further particularly achieved by a method for operating the actuator. The method comprises determining in the controller the actuated position by counting the motor rotations detected while the motor is operating at or above a threshold indicative of a load torque, and by not counting motor rotations detected while the motor is operating below said threshold.

In an embodiment, the method further comprises the controller determining a motor current of the electric motor, and determining the actuated position by counting the motor rotations detected while the motor current is at or above a current threshold indicative of the load torque, and by not counting motor rotations detected while the motor current is below said current threshold.

In an embodiment, the method further comprises the controller recording a course of the motor current while the electric motor moves the actuated part from a first actuated position in a forward direction to a second actuated position, and from the second actuated position in a reverse direction to the first actuated position, and defining the current threshold from the recorded course of the motor current.

In an embodiment, the method further comprises the controller repeatedly recording the course of the motor current, and repeatedly defining the current threshold from the recorded course of the motor current.

In an embodiment, the method further comprises the controller detecting a malfunctioning actuation of the actuated part by checking whether the present motor current deviates by more than a set tolerance level from a reference value of the motor current expected at the present actuated position.

In an embodiment, the method further comprises the controller detecting a malfunctioning actuation of the actuated part by checking whether the motor current exceeds a current threshold indicative of excessive torque while the actuated part is being moved to the actuated position.

In an embodiment, the method further comprises the controller detecting a malfunctioning actuation of the actuated part by checking whether the motor current reaches or exceeds a current threshold indicative of an end position when the actuated position is not the said end position.

In another embodiment, the method further comprises the controller determining a fluid flow through a valve controlled by the actuator, using a flow sensor, and determining the actuated position by counting the motor rotations detected while the fluid flow changes with a movement of the electric motor, and by not counting motor rotations detected while the fluid flow remains constant with a movement of the electric motor.

In an embodiment, the method further comprises the controller detecting a malfunctioning actuation of the actuated part by checking whether an actuation time for moving the actuated part from a first actuated position to a second actuated position exceeds a time threshold indicative of normal actuation time.

In an embodiment, the method further comprises the controller detecting an idle operation of the electric motor by checking whether the motor rotations exceed a rotation threshold indicative of an end position of the motor.

In an embodiment, the method further comprises the controller determining the motor current by measuring a voltage over a shunt.

In an embodiment, the method further comprises the controller detecting the motor rotations using a position sensor.

In an embodiment, the method further comprises the controller generating PWM signals for controlling the electric motor, and detecting the motor rotations from the PWM signals.

In an embodiment, the method further comprises the controller controlling the motor to operate at a higher speed while the motor is operating below said threshold, and controlling the motor to operate at a lower speed while the motor is operating at or above said threshold.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
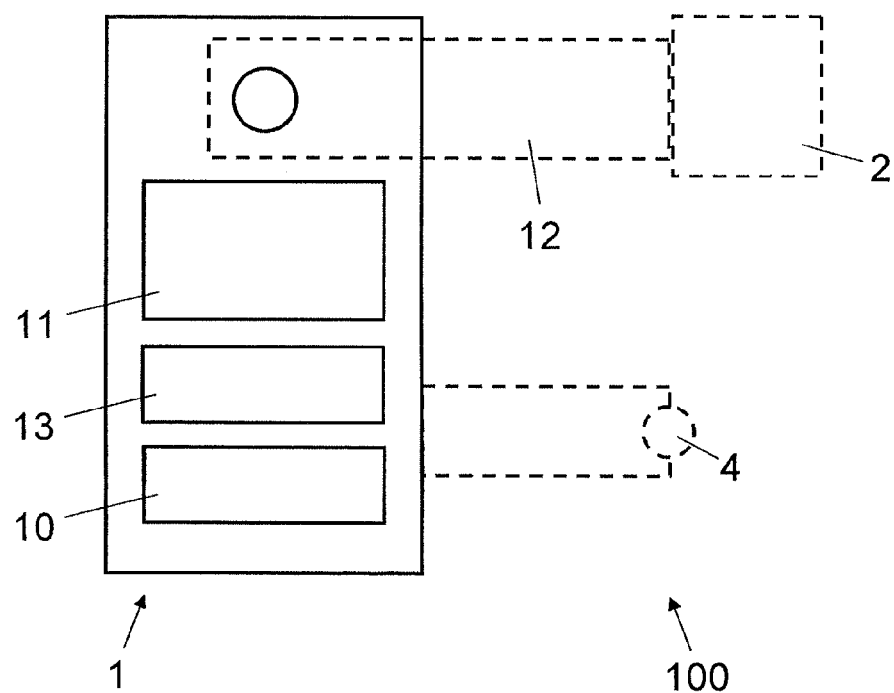
FIG. 1: shows a block diagram illustrating schematically an actuator having a controller and an electric motor.

In FIGS. 1, 2, 5, 7, and 9, reference numeral 1 refers to an actuator, e.g. an HVAC actuator. As illustrated in FIG. 1, the actuator 1 comprises an electric motor 11 and a controller to connected to the electric motor 11. The electric motor 11 is a DC motor, particularly a brushless DC motor. The controller 10 comprises a logic unit, for example an ASIC (Application Specific Integrated Circuit), a programmed processor, or another electronic circuit.

The controller 10 or its logic unit, respectively, is configured to control the electric motor 11. Specifically, the controller 10 is configured to commutate the electric motor 11 by generating control signals for a switching unit 13 to produce from a DC power supply 4 an AC electric signal for driving the electric motor 11. More specifically, the controller 10 is configured to generate PWM (Pulse Width Modulation) signals for controlling the switching unit 13. The controller to further configured to determine the motor current i supplied to the electric motor 11. In an embodiment, the controller 10 is configured to determine the motor current i from a voltage measured over a shunt and converted by an A/D-converter (Analog/Digital). The controller to is further configured to detect rotations performed by the electric motor 11. In an embodiment, the actuator 1 or its electric motor 11, respectively, comprises one or more position sensors and the controller 10 is configured to detect the motor rotations using position signals from the position sensor(s). The position sensor(s) include a potentiometer or one or more Hall-sensors, for example. In another embodiment, the controller is configured to determine the motor rotations from the generated PWM signals. Depending on the embodiment or configuration, the controller 10 and/or the position sensors, respectively, are configured to detect not only full but also partial rotations, e.g. 2.25 or 5.75 rotations (or smaller increments as achieved with potentiometer-based position sensors).

As illustrated schematically in FIGS. 1, 2, 5, 7, and 9, in its application and installed state, the actuator 1 or its electric motor 11, respectively, is coupled to an actuated part 2 by way of a coupling arrangement 12. The coupling arrangement 12 enables the actuator 1 or its electric motor 11, respectively, to move the actuated part 2. The coupling arrangement 12 includes drive shafts, gears, chains, levers, rods, clamps, and/or form fitted elements, for example. The actuated part 2 includes a valve, a damper, a shutter, a flap, or other mechanical parts, e.g. for adjusting the orifice through a pipe or duct for regulating the flow of fluids, such as water or air, e.g. in an HVAC system. Depending on application, configuration, and/or installation, the rotations performed by the electric motor 11 are transformed or transmitted by the coupling arrangement 12 into rotary or translatory movement of the actuated part 2.

As indicated in FIG. 1 by reference numeral 100, the actuator 1, the coupling arrangement 12, and the actuated part 2 form an actuation system 100.

Figure 2:
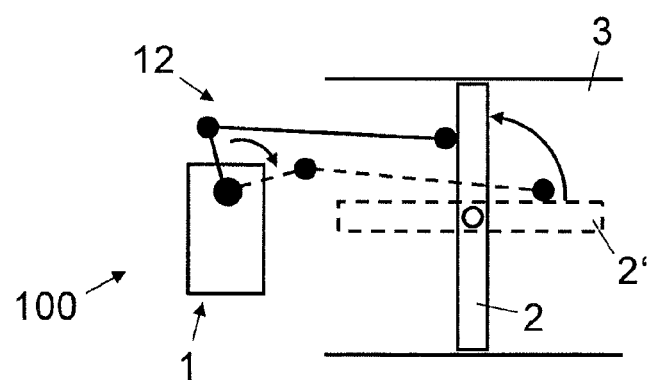
FIG. 2: shows a block diagram illustrating schematically an actuator moving an actuated part via a coupling arrangement between closed and open positions.

FIGS. 2, 5, 7, and 9 show examples of the actuation system 100 where the coupling arrangement 12 comprises levers and articulated joints to couple the actuator 1 to an actuated part 2, which has the form of a shutter arranged in a duct 3. As shown in FIGS. 2, 5, 7, and 9, the coupling arrangement 12 and the actuator 1 are configured to move the actuated part 2 in a movement range from a first end position, e.g. a closed position where the shutter closes the passage through the duct 3 to prevent any fluid flow, to a second end position, e.g. an open position where the shutter leaves the duct 3 open for maximum fluid flow. FIG. 2 illustrates a scenario where the actuated part 2 is in a closed position, after having been moved by the actuator 1 from an initial open position indicated by reference numeral 2'.

Figure 3:
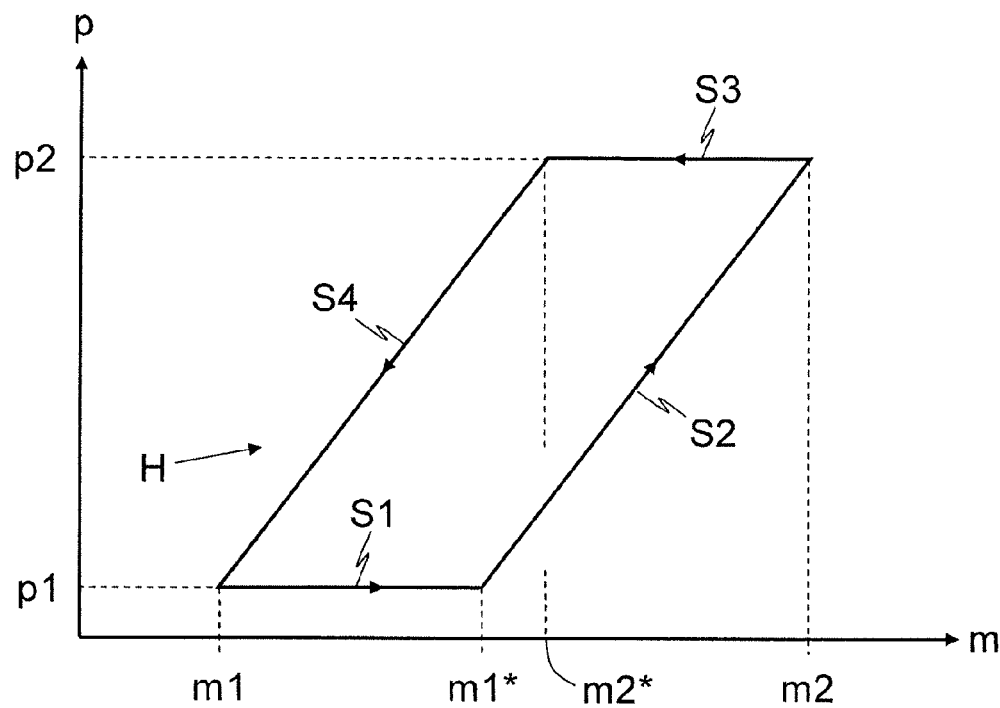
FIG. 3: shows a graph illustrating a system hysteresis of an actuator coupled to an actuated part, the hysteresis reflecting changes of directions when the actuator moves the actuated part between two positions.

FIG. 3 illustrates in a graph the hysteresis H of the actuation system 100. The system hysteresis H reflects the delayed response of the movement of the actuated part 2 to changes in direction of the rotations of the electric motor 11. On the x-coordinate, FIG. 3 shows the position m of the electric motor 11 in terms of motor rotations. On the y-coordinate, FIG. 3 shows the position p of the actuated part 2 in terms of an angle or a relative distance. As illustrated in FIG. 3, in step S1, the electric motor 11 changes its direction and rotates in a positive direction (e.g. clockwise), increasing the number of (partial or full) rotations from an initial value or motor position of m1 rotations to a value or motor position of m1*. Owing to the delayed response of movement of the actuated part 2 because of play, during the rotations of the electric motor 11 from the motor position m1 to m1*, the actuated part 2 does not change its position p and remains at position p1. In step S2, the electric motor 11 keeps rotating in the same direction as in step S1; however, the actuated part 2 is now being moved by the electric motor 11 and changes its position p. As illustrated in FIG. 3, in step S2 the actuated part 2 moves from its initial position p1 to the new position p2 when the electric motor 11 has rotated or moved to motor position m2. In step S3, the electric motor 11 reverses its direction (e.g. counter clockwise), decreasing the (partial or full) number of rotations from a value or motor position of m2 rotations to a value or motor position of m2*. Again, owing to the delayed response of movement of the actuated part 2 because of play, during the rotations of the electric motor 11 from the motor position m2 to m2*, the actuated part 2 does not change its position p and remains at position p2. In step S4, the electric motor 11 keeps rotating in the same direction as in step S3; however, the actuated part 2 is now being moved by the electric motor 11 and changes its position p. As illustrated in FIG. 3, in step S4 the actuated part 2 moves from its position p2 to the new position p1 when the electric motor 11 has rotated or moved back to motor position m1. The system hysteresis H may vary over time with changes in play and depends on various factors such as tolerances and/or wear and tear of mechanical components of the actuator 1, the coupling arrangement 12, and the actuated part, as well as on influences of temperature and/or moisture on these and other components, such as lubricants.

Figure 4:
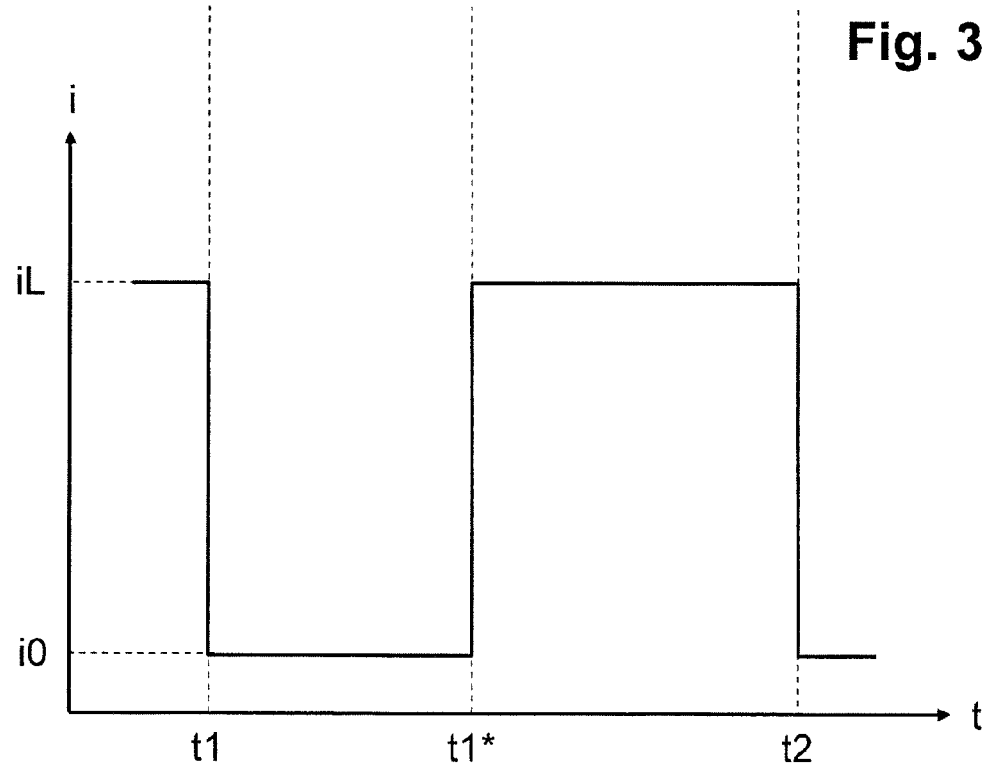
FIG. 4: shows a graph illustrating the system hysteresis with the temporal course of the motor current while the actuator changes the direction of movement of the actuated part.

FIG. 4 illustrates in a graph the temporal course of the motor current i while the electric motor 11 and the actuated part 2 perform the movements described above in connection with the system hysteresis H. As shown in FIG. 4, from the point in time t1 up to the point in time t1*, i.e. during step S1, the motor current i is at a low level io, indicative of a minimum torque with barely any load on the electric motor 11. Subsequently, from the point in time t1* up to the point in time t2, i.e. during step S2, the motor current i is at a comparatively higher level iL, indicative of a load torque that corresponds to the full load of the actuated part 2 on the electric motor 11. Subsequently, the course of the motor current i would be at the low level io, without any significant load of the actuated part 2 onto the electric motor 11 during step S3, and at the high level iL, with the full load of the actuated part 2 on the electric motor 11 during step S4.

Figure 11:
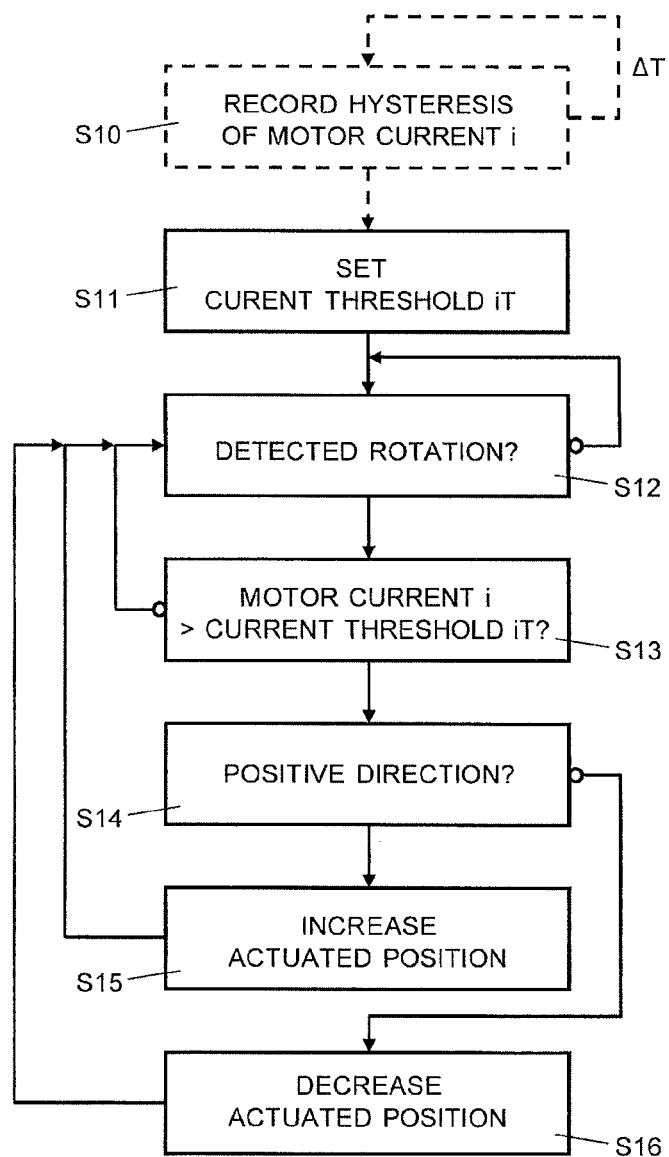
FIG. 11: shows a flow diagram illustrating an exemplary sequence of steps for determining the position of an actuated part.

In the following paragraphs, described with reference to FIGS. 3 and 11 are possible sequences of steps performed by the controller to for determining the actuated position of the actuated part 2. In essence, the controller to is configured to include in the calculation of the actuated position p the (partial or full) motor rotations m detected while the motor is operating at or above a threshold iT indicative of a load torque, and to not include in the calculation of the actuated position p the motor (partial or full) rotations m detected while the motor is operating below said threshold. Specifically, the controller to is configured to include (count) in the calculation of the actuated position p the (partial or full) motor rotations m detected while the motor current i is at or above a set current threshold iT indicative of a load torque, and to not include (not count) in the calculation of the actuated position p the motor (partial or full) rotations m detected while the motor current i is below said current threshold iT. Alternatively, instead of comparing the motor current i to a current threshold iT to determine whether the electric motor is operating at or below a load torque, the controller to is configured to determine the system hysteresis or operating state of the electric motor 11, respectively, based on measurements of torque. Specifically, the controller 10 is configured to compare the measured torque to a torque threshold that indicates the load torque.

In an alternative embodiment, the controller 10 is configured to determine the system hysteresis or operating state of the electric motor 11, respectively, based on measurements of a fluid flow through a valve controlled by the actuator 1. Specifically, the controller 10 is configured to determine the fluid flow, using a flow sensor, and to include (count) in the calculation of the actuated position p the (partial or full) motor rotations m detected while the fluid flow changes (increases or decreases), indicative of the motor operating at a load torque, and to not include (not count) in the calculation of the actuated position p the motor (partial or full) rotations m detected while the fluid flow remains essentially constant, indicative of the motor not operating at a load torque. One skilled in the art will understand that the criteria for deciding whether the fluid flow actually changes or remains constant may be tied to threshold values indicative of an increasing or decreasing fluid flow, or a constant fluid flow, respectively, e.g. upper and a lower flow rate change threshold values.

In an embodiment, two different values are used for the current threshold or for the torque threshold, respectively, in order to allow for "noise" or "jitter" on the measured motor current i or torque, respectively, e.g. a lower threshold value for detecting the start of the idle phase of the hysteresis H (in FIG. 4 at t1 or t2), and a comparatively higher, upper threshold value for detecting the end of the idle phase of the hysteresis H (in FIG. 4 at t1*). The difference between the lower and the upper threshold values is determined such that said difference is greater than the value of the "noise" or "jitter" on the measured motor current i or torque, respectively.

In a further embodiment, the values of the current threshold or of the torque threshold, respectively, are set or adjusted by the controller 10 depending on the speed of the electric motor 11. For example, different threshold values are stored in the controller 10 for different motor speeds. Specifically, higher threshold values are stored and used with increasing or higher motor speeds.

In yet a further embodiment, to increase efficiency and improve performance, depending on the anticipated or programmed direction of the electric motor 11 or the actuated part 2, respectively, the controller 10 puts a forward-bias (for anticipated forward direction) or a backward-bias (for anticipated reverse direction) on the electric motor 1, i.e. the controller to controls the electric motor 11 to drive through the idle phase of the system hysteresis H (e.g. in FIG. 4 from motor position m1 to m1* or from motor position m2 to m2*, respectively), so that there is no or only minimum delay between an actual command or signal to move the actuated part 2 in the anticipated direction.

As illustrated in FIG. 1, in optional step S10, the controller 10 measures the system hysteresis H by recording the course of the motor current i while controlling the electric motor 11 to move the actuated part 2 in steps S1 and S2 from a first actuated position p1 in a forward direction to a second actuated position p2, and to move the actuated part 2 in steps S3 and S4 from the second actuated position p2 in reverse direction to the first actuated position p1. It should be pointed out that, in an embodiment, the controller 10 measures the system hysteresis H by recording the course of the motor current i during regular operation of the electric motor 1, i.e. without purposefully controlling the electric motor 11 during a calibration phase to move the actuated part 2 from the first actuated position p1 in forward direction to the second actuated position p2, and to move the actuated part 2 from the second actuated position p2 in reverse direction to the first actuated position p1.

In step S1, the controller determines from the recorded course of the motor current i (as illustrated partly in FIG. 4), the current threshold iT that indicates the load torque. For example, the current threshold iT is set to the measured high level iL of the motor current i, indicative of the load torque with full load of the actuated part 2 on the electric motor 11, or to a value derived from the high level motor current iL, e.g. at iT=95% of iL. One skilled in the art will understand that in an approach based on torque measurements, values for torque threshold(s) can be determined correspondingly on the basis of a course of torque values recorded while the electric motor 11 and the actuated part 2 perform the movements described above in connection with the system hysteresis H.

As indicated by step ΔT, in an embodiment, the controller to performs repeatedly measurements of the hysteresis of the motor current i, in order to account for temporal changes of play in the actuation system 100 and, thus, changes of the system hysteresis H, and resets the current threshold iT accordingly based on the new measurement. Thus, the controller to repeatedly records the course of the motor current i (or torque), and repeatedly defines the current threshold (or torque threshold) from the recorded course of the motor current i (or recorded course of torque).

As one skilled in the art will understand, alternatively, the current threshold iT (or torque threshold) is set statically as a system parameter, e.g. based on a configuration table that indicates different current thresholds iT (or different torque thresholds) for different configurations and combinations of actuators 1, electric motors 11, coupling arrangements 12, and actuated parts 2.

In step S12, the controller to determines whether a motor (partial or full) rotation was detected.

If a rotation was detected, the controller to determines in step S13 whether the present motor current i (or torque) is at or above the set current threshold iT (or torque threshold). In the approach based on fluid flow, the controller to determines whether the flow of fluid increases or decreases at a change rate at or above a set threshold for change of flow rate.

If the motor current i (or torque) is below the set current threshold iT (or torque threshold), the controller 10 proceeds in step S12 by checking whether a motor rotation was detected. In the approach based on fluid flow, the controller 10 proceeds accordingly, if the change rate of the fluid flow is below the threshold for change of flow rate.

Otherwise, if the motor current i (or torque) is at or above the set current threshold iT (or torque threshold), the controller 10 determines in step S14 whether the electric motor 11 is presently moving in a positive (e.g. clockwise) direction. In the approach based on fluid flow, the controller 10 proceeds accordingly, if the change rate of the fluid flow is at or above the threshold for change of flow rate.

If the electric motor 11 is moving in the positive direction, in step S15, the controller 10 increases the actuated position p by a value that corresponds to the movement (translation or rotation) of the actuated part 2 resulting from one (or a partial) motor rotation.

If on the other hand the electric motor 11 is moving in the negative direction (e.g. counter clockwise), in step S16, the controller 10 decreases the actuated position p by a value that corresponds to the movement (translation or rotation) of the actuated part 2 resulting from one (or a partial) motor rotation.

One skilled in the art will understand, that with an increasing number of directional changes, and thus operating of the electric motor 11 or actuator 1, respectively, through the system hysteresis H with play between the electric motor 11 and the actuated part 2, there is an increase in aggregated error. Consequently, with an increase of the number of directional changes, the precision of the determined actuated position deteriorates and, possibly, the determined actuated position drifts. Therefore, the controller 10 resynchronizes the value of the actuated position over time. For example, the controller 10 resynchronizes the value of the actuated position whenever the actuated part is at a known position, e.g. at a defined closed or open position, e.g. at 0° or 90°, depending on the configuration.

In an embodiment, detection of the system hysteresis H is not only used for determining more accurately the actuated position, but also to speed up the electric motor 11 while it is rotating in idle mode through the hysteresis H or play between the electric motor 11 and the actuated part 2. Specifically, the controller 10 is configured to control the motor 11 to operate at a higher speed, while the motor 11 is operating below torque load (e.g. indicated by a motor current i or torque at or above the respective threshold, or by an increasing fluid flow with rotating electrical motor 11), and to control the electric motor 11 to operate at a lower speed while the electric motor 11 is operating at torque load (e.g. indicated by a motor current i or torque below the respective threshold, or by a constant fluid flow while the electric motor 11 is rotating).

The controller 10 is further configured to use the determined actuated position p and the present motor current i to identify malfunctioning actuation caused for various reasons. Essentially, the controller to is configured to detect the malfunction by checking whether the present motor current i deviates by more than a set tolerance level from a reference value of the motor current expected at the present actuated position p, whereby the motor current is representative of the present torque.

Figure 6:
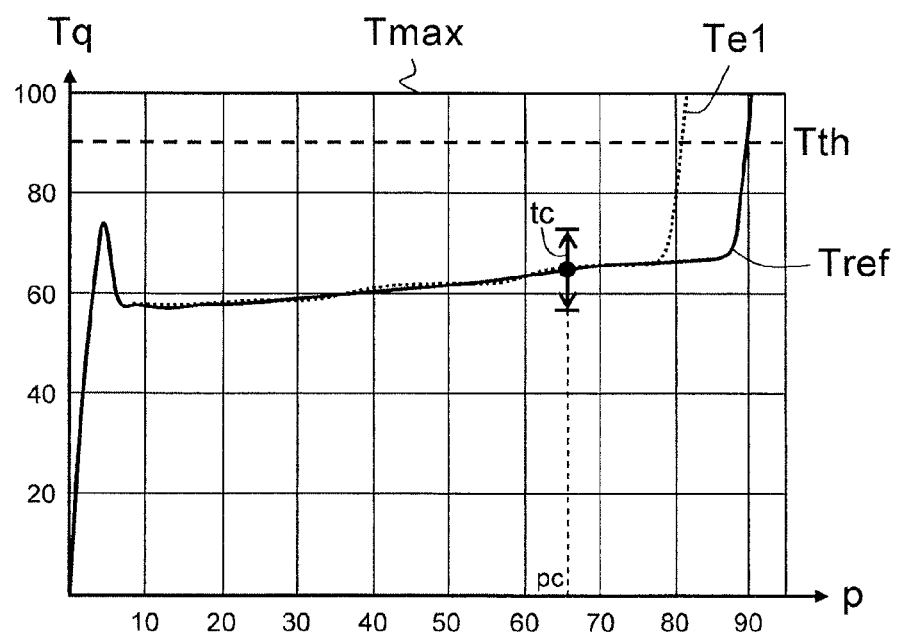
FIG. 6: shows a graph illustrating the torque of the actuator when the actuated part is moved from an initial open position to a closed end position or to a blocked position, respectively.
Figure 8:
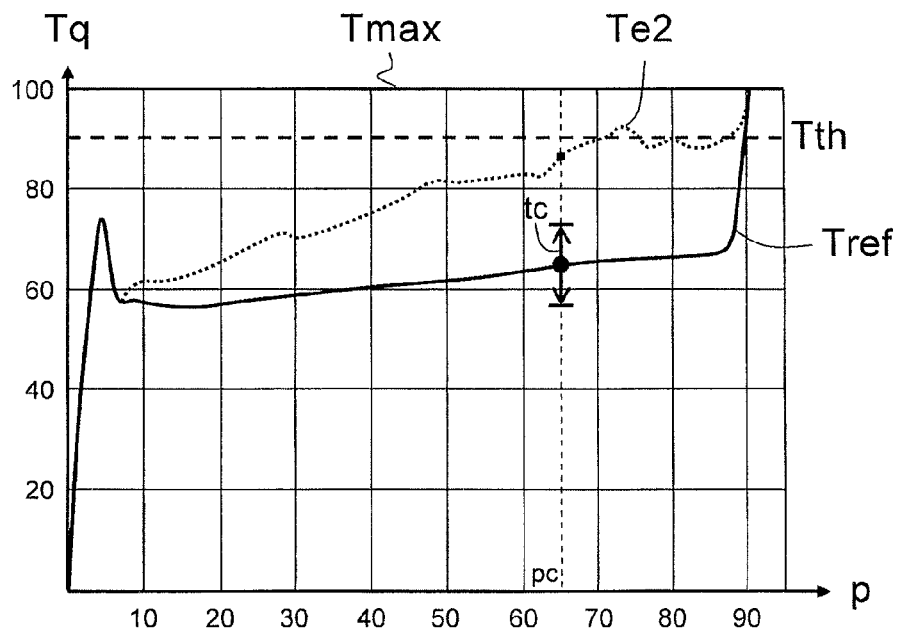
FIG. 8: shows a graph illustrating the torque of the actuator when the actuated part is moved from an initial closed position to an open end position, with or without strained conditions.
Figure 10:
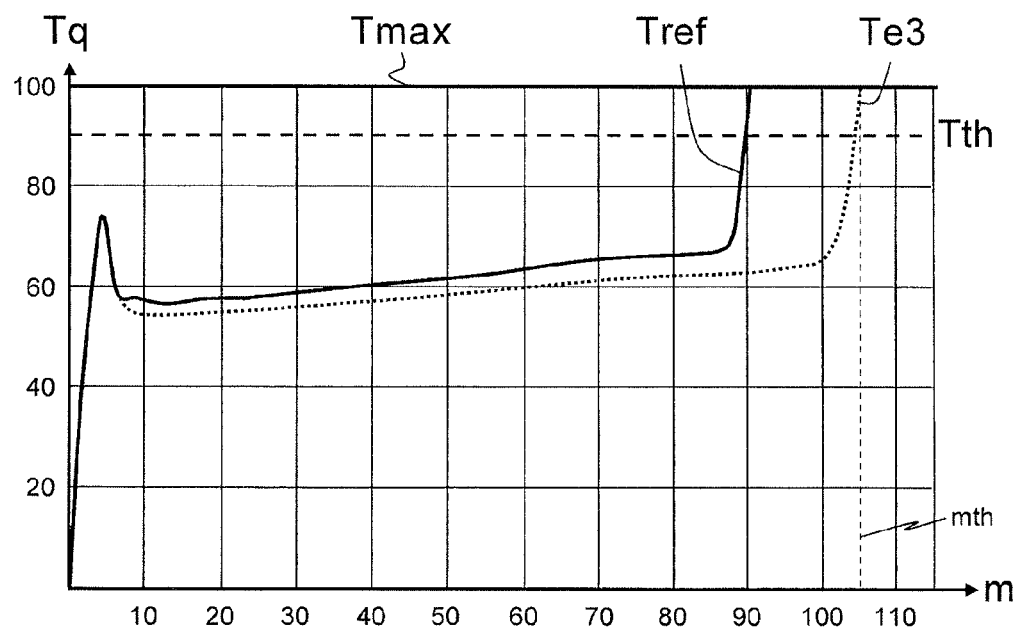
FIG. 10: shows a graph illustrating the torque of the actuator when the actuator executes a movement for moving the actuated part from an initial closed position to an open position, with or without faulty coupling of the actuator and actuated part.

In FIGS. 6, 8, and 10, reference numeral Tref refers to the expected course of the motor current i or the corresponding torque under normal circumstances, when the actuated part 2 is moved by the electric motor 11 from an initial first end position, e.g. an open position, to a second end position, e.g. a closed position. This reference course of motor current or torque Tref, respectively, is stored in the controller 10, for example, as a set of reference torque or current values Tq for different actuated positions p, or for a range of actuated positions p within the actuation range from the first to the second end position. In FIGS. 6, 8, and 10, the current or torque values Tq are indicated as a percentage of a defined maximum motor current or torque value Tmax.

Figure 5:
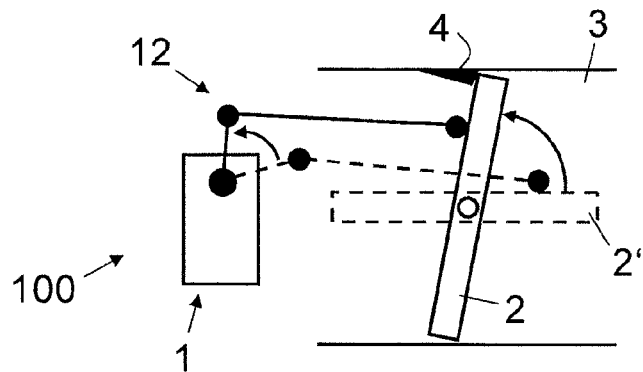
FIG. 5: shows a block diagram illustrating schematically an actuator moving an actuated part via a coupling arrangement from an open position to a blocked position.

FIG. 5, illustrates a scenario of the actuation system 100 where the movement of the actuated part 2 is restricted by an obstacle 4. The obstacle 4 blocks the actuated part 2 or parts of the coupling arrangement 12. In the example illustrated in FIG. 5, the actuated part 2 is blocked by the obstacle 4, such that the actuated part 2 cannot be moved fully from the open position, designated by reference numeral 2', to the closed position.

FIG. 6, illustrates the course of the motor current or torque Te1 that results from the blocking scenario of FIG. 5. As shown in FIG. 6, owing to the blockage by the obstacle 4, the course of the motor current or torque Te1 deviates significantly from the reference course of motor current or torque Tref in that it increases to the maximum motor current or torque value Tmax at a position, e.g. a blocked position at approximately 80°, that is reached before the end position, e.g. the closed position at approximately 90°. The controller 10 is configured to detect this malfunctioning actuation of the actuated part 2 by checking whether the present motor current or torque Tq reaches or exceeds a motor current or torque threshold value Tth, before the actuated part 2 reaches the closed end position.

Figure 7:
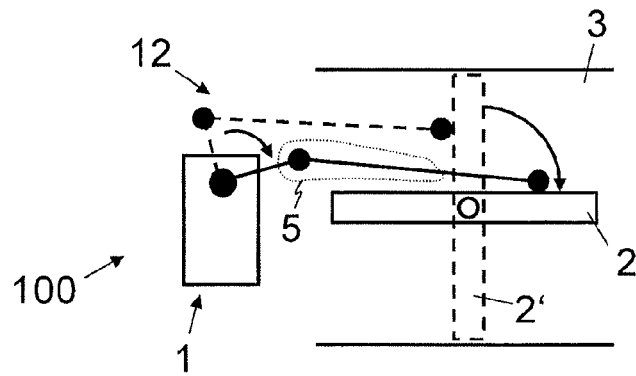
FIG. 7: shows a block diagram illustrating schematically an actuator moving an actuated part via a coupling arrangement under strained conditions from a closed position to an open position.

FIG. 7, illustrates a scenario of the actuation system 100 where the actuation of actuated part 2 is strained because of an obstructed, damaged, or jammed coupling arrangement 12 or articulated joints or the like. The obstruction 5 strains the actuation of the actuated part 2 or parts of the coupling arrangement 12 while the actuated part 2 is being moved from the closed position, designated by reference numeral 2', to the open position, as illustrated in FIG. 7.

FIG. 8, illustrates the course of the motor current or torque Te2 that results from the obstruction scenario of FIG. 7. As shown in FIG. 8, owing to the obstruction 5, the course of the motor current or torque Te2 deviates significantly from the reference course of motor current or torque Tref in that it has an increased level throughout the whole movement or actuation of the actuated part 2, from an initial position at approximately 10° to the open end position at approximately 90°. The controller 10 is configured to detect this malfunctioning actuation of the actuated part 2 by checking whether the present motor current or torque Tq reaches or exceeds a motor current or torque threshold value Tth that indicates excessive current or torque Tq while the actuated part 2 is being moved to the actuated position.

In an embodiment, the controller 10 is configured to detect the malfunctioning actuation of the actuated part 2 of FIGS. 5-8 by checking whether the present motor current or torque Tq deviates by more than a defined tolerance level tc, e.g. a percentage or a value range, from the reference value of motor current or torque Tref expected at the present actuated position pc.

Figure 9:
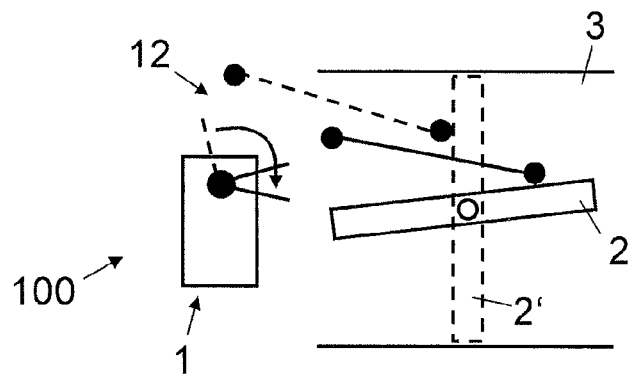
FIG. 9: shows a block diagram illustrating schematically an actuator with a faulty coupling arrangement to an actuated part.

FIG. 9, illustrates a scenario of the actuation system 100 where the coupling arrangement 12 to the actuated part 2 is faulty. Specifically, the coupling arrangement 12 does not properly couple the actuator 1 to the actuated part 2, e.g. because of faulty installation or parts of the coupling arrangement 12. Owing to the faulty coupling arrangement 12, the actuator 1 or its electric motor 11, respectively, is running practically idle, without moving the actuated part 2. Consequently, the actuator 1 is not stopped or restricted by the end position of the actuated part 2 and will move up to its inherent end position (set mechanically or by programmed end points).

FIG. 10, illustrates the course of the motor current or torque Te3 that results from the blocking scenario of FIG. 9. Unlike in FIGS. 6 and 10, in FIG. 10, the course of the motor current or torque Te3 and the reference course of motor current or torque Tref are depicted in relation to the motor position m as opposed to the actuated position p, as the actuated part 2 is not actually being moved by the actuator 1. As shown in FIG. 10, owing to the faulty coupling arrangement 12, the course of the motor current or torque Te3 deviates significantly from the reference course of motor current or torque Tref in that it increases to the maximum motor current or torque value Tmax at an extended motor position m, beyond what would under normal circumstances be the regular end position of the actuated part 2, e.g. at an end position of the motor at approximately 105°. The controller 10 is configured to detect this idle operation of the electric motor 11 either by checking whether the motor position m exceeds or reaches a position threshold mth indicative of a motor end position, or by checking whether the present motor current or torque Tq reaches or exceeds a motor current or torque threshold value Tth, before the actuated part 2 reaches the intended end position, i.e. before the calculated actuated position p is at or beyond the intended end position of the actuated part 2, i.e. the intended closed or open position. For example, the controller to is configured to check whether the motor position m exceeds or reaches the motor end position, by checking whether the motor rotations exceed a rotation threshold indicative of an end position of the electric motor 11.

The controller to is further configured to detect a malfunctioning actuation of the actuated part 2 by checking whether an actuation time for moving the actuated part 2 from a first actuated position to a second actuated position exceeds a (stored) time threshold indicative of normal actuation time.

In connection with a spring return actuator 1, where the electric motor 11 and thus the actuated part 2 is moved by way of a spring to a safety position, e.g. a closed or open position of the actuated part 2 in case of a power failure, the controller to is configured to detect obstructed and/or strained return movement. For that purpose, the controller to is configured to measure, in a test mode, the return time for the spring to return the electric motor 11 and the actuated part 2 to the safety position, and to check whether the measured return time exceeds a return time threshold indicative of strained or obstructed return time, e.g. 25 seconds.

The controller to is configured to indicate to a user any detected malfunctioning or obstruction, e.g. by generating an acoustic and/or visual alarm signal. In an embodiment, controller to is further configured to transmit an alarm signal to a higher level or supervisory control system, indicating to the control system an identifier and/or location of the actuator 1. In an embodiment, controller to is further configured to generate control signals for setting the actuator 1 to operate at a reduced motor speed.

The invention claimed is:

1. An HVAC actuator comprising an electric motor for moving an actuated mechanical part to an actuated position for adjusting an orifice to regulate the flow of fluids through a pipe or duct in an HVAC system, and a controller connected to the electric motor,
wherein the controller of the HVAC actuator is configured to store a reference course of a motor current, which reference course indicates a course of the motor current, expected when the electric motor of the HVAC actuator moves the actuated mechanical part from a first position to a second position, and comprises a set of reference current values for different actuated positions, within an actuation range from the first position to the second position; and
wherein the controller is further configured to detect a malfunctioning actuation of the actuated mechanical part by checking whether a present motor current deviates by more than a set tolerance level from a reference value of the motor current expected at a present actuated position.

2. The HVAC actuator of claim 1, wherein the controller is further configured to detect the malfunctioning actuation of the actuated mechanical part by checking whether the motor current exceeds a current threshold indicative of excessive torque while the actuated mechanical part is being moved to the actuated position.

3. The HVAC actuator of claim 1, wherein the controller is further configured to detect the malfunctioning actuation of the actuated mechanical part by checking whether the motor current reaches or exceeds a current threshold indicative of an end position when the actuated position is not the said end position.

4. The HVAC actuator of claim 1, wherein the controller is further configured to detect the malfunctioning actuation of the actuated mechanical part by checking whether an actuation time for moving the actuated mechanical part from a first actuated position to a second actuated position exceeds a time threshold indicative of normal actuation time.

5. The HVAC actuator of claim 1, wherein the controller is further configured to record a course of the motor current while the electric motor moves the actuated mechanical part from a first actuated position to a second actuated position.

6. The HVAC actuator of claim 5, wherein the controller is configured to record the course of the motor current while controlling the electric motor during a calibration phase to move the actuated mechanical part from the first actuated position to the second actuated position.

7. The HVAC actuator of claim 1, wherein the controller is further configured to detect motor rotations, and to determine the actuated position by counting the motor rotations detected while the motor is operating at or above a threshold indicative of a load torque, and by not counting motor rotations detected while the motor is operating below said threshold.

8. The HVAC actuator of claim 7, wherein the controller is further configured to detect an idle operation of the electric motor by checking whether the motor rotations exceed a rotation threshold indicative of an end position of the motor.

9. A method for operating an HVAC actuator which comprises an electric motor for moving an actuated mechanical part to an actuated position for adjusting an orifice to regulate the flow of fluids through a pipe or duct in an HVAC system, and a controller connected to the electric motor, wherein the method comprises:
- storing in the controller a reference course of a motor current, which reference course indicates a course of the motor current, expected when the electric motor moves the actuated mechanical part from a first position to a second position, and comprises a set of reference current values for different actuated positions, within an actuation range from the first position to the second position; and
- detecting in the controller a malfunctioning actuation of the actuated mechanical part by checking whether a present motor current deviates by more than a set tolerance level from a reference value of the motor current expected at a present actuated position.

10. The method of claim 9, wherein the method further comprises the controller detecting the malfunctioning actuation of the actuated mechanical part by checking whether the motor current exceeds a current threshold indicative of excessive torque while the actuated mechanical part is being moved to the actuated position.

11. The method of 9, wherein the method further comprises the controller detecting the malfunctioning actuation of the actuated mechanical part by checking whether the motor current reaches or exceeds a current threshold indicative of an end position when the actuated position is not the said end position.

12. The method of 9, wherein the method further comprises the controller detecting the malfunctioning actuation of the actuated mechanical part by checking whether an actuation time for moving the actuated mechanical part from a first actuated position to a second actuated position exceeds a time threshold indicative of normal actuation time.

13. The method of 9, wherein the method further comprises the controller recording a course of the motor current while the electric motor moves the actuated mechanical part from a first actuated position to a second actuated position.

14. The method of claim 13, wherein the method comprises the controller recording the course of the motor current while controlling the electric motor during a calibration phase to move the actuated mechanical part from the first actuated position to the second actuated position.

15. The method of 9, wherein the method further comprises the controller detecting motor rotations, and determining the actuated position by counting the motor rotations detected while the motor is operating at or above a threshold indicative of a load torque, and by not counting motor rotations detected while the motor is operating below said threshold.

16. The method of claim 15, wherein the method further comprises the controller detecting an idle operation of the electric motor by checking whether the motor rotations exceed a rotation threshold indicative of an end position of the motor.

* * * * *